United States Patent [19]
Milan-Kamski

[11] Patent Number: 5,506,404
[45] Date of Patent: Apr. 9, 1996

[54] RETROFITTING DEVICE PROVIDING AUTOMATIC READING CAPABILITY FOR METERING SYSTEMS

[76] Inventor: W. J. Milan-Kamski, 1802 Ridgewick Rd., Glen Burnie, Md. 21061

[21] Appl. No.: 117,694

[22] Filed: Sep. 8, 1993

[51] Int. Cl.⁶ ............................ G01D 5/34; G08C 17/00
[52] U.S. Cl. .................. 250/231.14; 250/231.16; 340/870.28
[58] Field of Search .................. 250/231.13, 231.14, 250/237 G, 227.21, 231.16; 340/870.02, 870.28, 870.29

[56] References Cited

U.S. PATENT DOCUMENTS

| | | | |
|---|---|---|---|
| 4,654,523 | 3/1987 | Tanaka | 250/227.21 |
| 4,811,368 | 3/1989 | Lee | 340/870.02 |
| 5,311,581 | 5/1994 | Merriam | 340/870.02 |

FOREIGN PATENT DOCUMENTS

| | | | |
|---|---|---|---|
| 6111421 | 9/1981 | Japan | 250/231.14 |
| 2175614 | 8/1987 | Japan | 250/227.21 |
| 0204125 | 9/1987 | Japan | 250/231.14 |
| 63-30718 | 8/1988 | Japan | 250/231.14 |
| 0090020 | 3/1990 | Japan | 250/231.14 |

Primary Examiner—William L. Sikes
Assistant Examiner—Tiep H. Nguyen
Attorney, Agent, or Firm—Walter G. Finch

[57] ABSTRACT

The present invention provides a retrofitting assembly and system providing automatic reading capability for gas, electric power, and water meters. The assembly includes a differential sensing system which recognizes and stores the angular position of an optical pattern mounted onto a rotating member of a meter. Light pulses stemming from pulsed sources travel through fiber optic cables on their way to the optical pattern. A Sensing/Transmitting/Receiving module generates, processes, and stores the pulses sent to and received from the optical pattern. Also disclosed is a billing system which may be built around the retrofitted or modified meters.

6 Claims, 2 Drawing Sheets

RETROFITTING DEVICE PROVIDING AUTOMATIC READING CAPABILITY FOR METERING SYSTEMS

FIELD OF THE INVENTION

This invention relates generally to metering systems which measure the consumption of gas, electric power, and water over a period of time, and more particularly, to a retrofitting device for use therewith.

BACKGROUND AND PRIOR ART OF THE INVENTION

Reading of electric power, gas, and water meters is presently done via visual or electronic means by human meter readers who have to either gain access to the dwellings or read from the outside of the apartments, houses, shops, etc.

Automatic reading and transmission of meter readings to centralized billing centers eliminates the need for human meter readers. Elimination of the need for dispatching utility employees to periodically read the meters results in substantial reduction in operating costs.

There are various types of meters on the market that provide automatic electronic reading capability. However, replacement of existing meters with entirely new and different meters presents enormous cost problems. The existing meters must be removed from service and scrapped. The new meters must be purchased and installed at a tremendous cost. The combined cost of the existing meters that must be scrapped and the new meters that must be installed is frequently prohibitive.

The Hoss U.S. Pat. No. 4,327,362 teaches an apparatus for beaming a light onto a meter rotor whose metallic surface normally reflects light. A darkened section on the face of the meter rotor absorbs light so that each rotation of the meter rotor produces an interval where no light is reflected. The meter rotations are monitored at a remote location through the use of fiber optic cables.

The U.S. Pat. No. 3,875,406 issued to Holeman discloses an improved stationary optical system for remote meter readers having a number of rotating aperture discs and a rotating scanning disc. The Holeman invention includes a light source, collimating optics, collecting optics, and a detector.

The Green U.S. Pat. No. 5,214,587 introduces a device for monitoring utility usage. The Green invention senses the rotation of a meter disk via infrared light signals and transmits data to a customer interface unit having an LCD display.

SUMMARY OF THE INVENTION

The present invention concerns itself with a modification approach that is applicable to virtually any type of meter that does not possess an automatic reading capability. The proposed modification kit does not impose any load or drag on the mechanism of the meters. It requires neither bringing electric power to the meters nor installing batteries inside the meters. This feature is particularly important in the case of gas meters that contain flammable medium and consequently cannot be fitted with anything that may generate sparks or cause heating.

The principal embodiment of the instant invention is based on the use of fiber optic cables in conjunction with a transparent/opaque or reflective/non-reflective pattern that is attached to any revolving or reciprocating member of the meters. This optical system may be retrofitted onto existing metering systems or incorporated into the design of new meters as they are being manufactured. An S/T/R module (Sensor/Transmitter/Receiver), located at a remote location from the meters, generates electronic interrogation pulses which allow it to sense the motion of the pattern within the meter via the processing of returned pulses. The S/T/R module is connected by means of fiber optic cables, telephone lines, or power lines to a local billing center. Only one S/T/R module is needed to service several meters.

In addition to generating interrogation pulses for the meters and processing the returned pulses, the S/T/R module accumulates meter readings in real time and stores them in non-volatile memories. The S/T/R module also receives interrogation commands from a local billing center which initiate the transfer of the meter readings to the local billing center. In case of system failure or tampering, the S/T/R module sends a distress signal to the local billing center. Also, since the S/T/R module has circuitry capable of receiving and transmitting data, it can be used as a repeater to reconstitute signals sent on data transmission lines. This feature is important for transmitting data over power lines for long distances.

The S/T/R module is located at an easily accessible location for the consumer to monitor at his or her own convenience. For ease in reading the S/T/R module, an LCD display and a number of selection buttons are included directly on the module. In addition to showing the local visual readout of each meter, the LCD display may also be used to indicate the current rate charged for each meter. As regards modified (retrofitted) meters, the LCD display would be only a secondary means of readout. However, it would be a significant convenience for the user since the S/T/R module will be more accessible than the meters themselves. With respect to new meters, however, the LCD display on the S/T/R module may very well be the primary means of locally displaying the meter readings.

ADVANTAGES OF THE INVENTION

The retrofit kit is extremely simple and easy to install. The installation procedure consists of bringing the fiber optic cables to the vicinity of any rotating or reciprocating member which is fitted with a suitable optical pattern whose motion is directly related to the meter reading. The optical pattern can be easily installed either by cementing it to the rotating or reciprocating member or by attaching it thereon by means of a spring loaded friction device.

The retrofit device can also be easily incorporated into new meters while they are being manufactured. Since local visual readout does not depend on the presently used mechanical visual readout incorporated into the meters, the entire mechanical readout assembly could be eliminated in order to drastically reduce the cost of making the meters.

As it is a well known fact that the reliability of modern electronic integrated assemblies is far superior to that of equivalent mechanical assemblies, the replacement of the mechanical readout devices with a readout based on integrated circuits will improve the overall dependability of the entire metering system.

OBJECTS OF THE INVENTION

It is an object of this invention to provide a novel retrofitting assembly which uses an optical system to add automatic reading capability to utility meters.

Another object of this invention is to provide a retrofitting assembly which uses an optical pattern mounted onto a rotating member of a utility meter and having alternating reflective and non-reflective segments.

And to provide a novel retrofitting assembly for utility meters which uses a Sensing/Transmitting/Receiving module to generate, process, and store electronic pulses sent to and received from an optical pattern is still another object of this invention.

BRIEF DESCRIPTION OF THE DRAWINGS

These and other objects and attendant advantages of this invention will become more obvious and understood from the following detailed specification and accompanying drawings, in which.

DESCRIPTION OF THE PREFERRED EMBODIMENTS OF THE INVENTION

Figure 1:
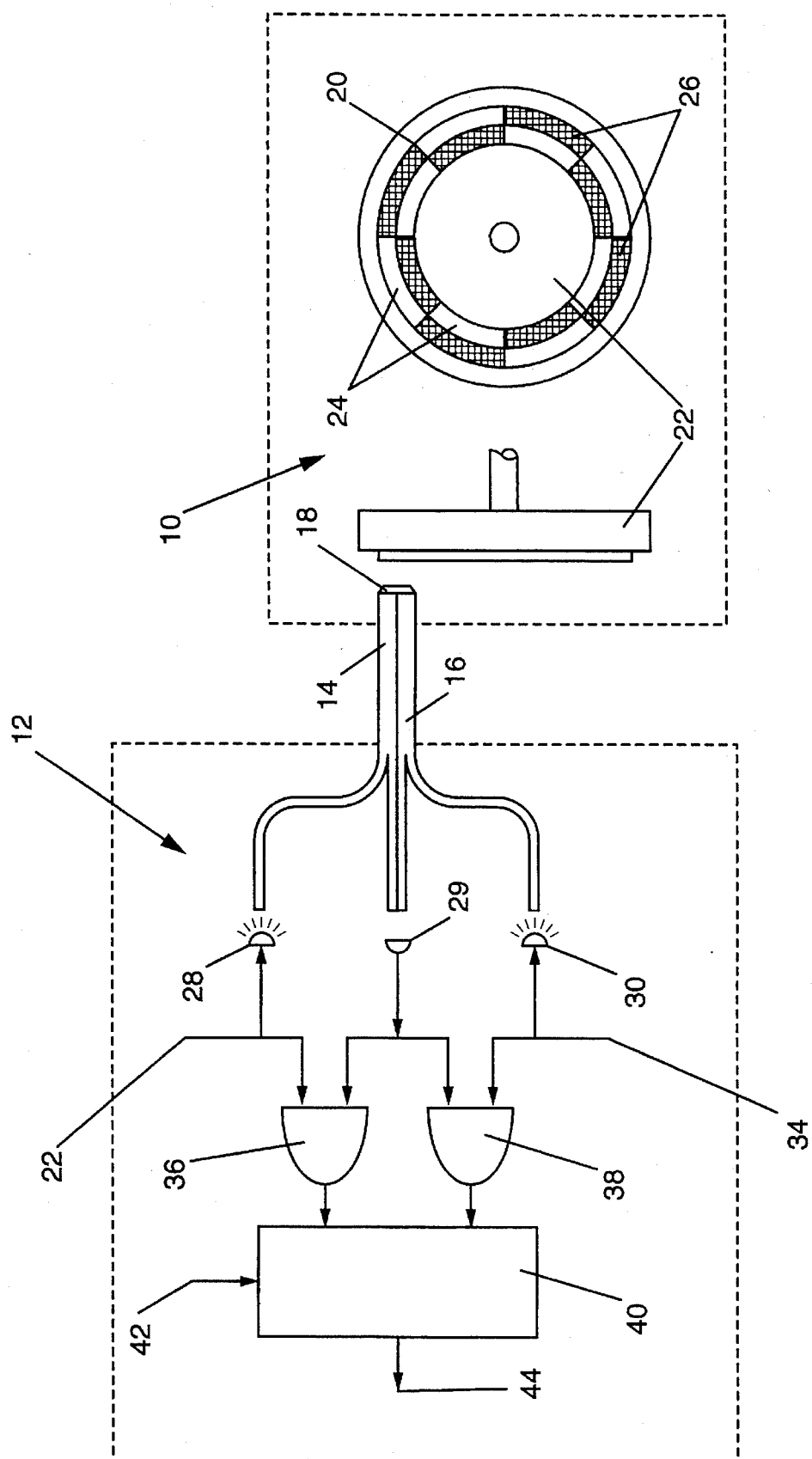
FIG. 1 is a simplified functional diagram of an optical assembly for utility meters, incorporating novel features and embodiments of this invention.
Figure 2:
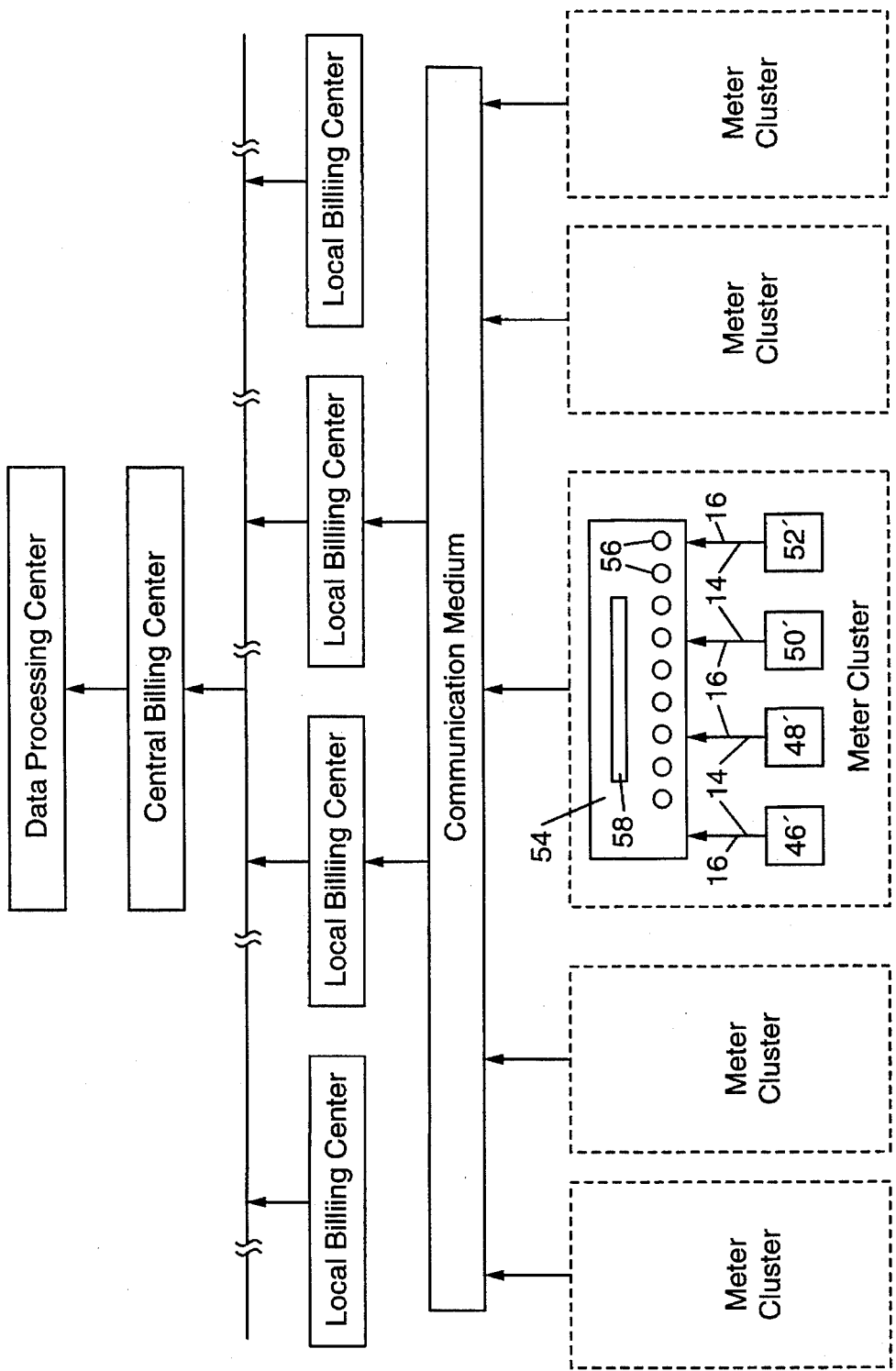
FIG. 2 is a simplified block diagram of a billing system which may be built around the optical assembly of FIG. 1.

Referring now to FIGS. 1 to 2 of the drawings, there is shown the preferred embodiment of a retrofitting assembly for providing automatic reading capability to metering systems. An installed fiber optic assembly together with its electronic signal processing logic is shown in FIG. 1, while the entire billing system capable of being built around the modified or retrofitted meters is shown in FIG. 2.

Referring now to FIG. 1, a typical metering assembly including a revolving member 22 is generally denoted by reference to numeral 10. Some distance (up to thirty five feet) from the metering area 10, there is located an electronic pulse generating and processing section 12. The electronic pulse generating and processing section 12 constitutes only one portion of the S/T/R (Sensing/Transmitting/Receiving) module 54, seen in FIG. 2. The electronic pulse generating and processing section 12 is coupled to the metering area 10 via two fiber optic cables 14 and 16.

The two fiber optic cables 14 and 16 have a first set of ends which run adjacent and parallel to one another and terminate in a cable lens 18. The fiber optic cables 14 and 16 and the cable lens 18 run perpendicularly toward and just off of the front surface of the revolving member 22 which is covered with a circular optical pattern 20. The optical pattern 20, which is cemented or otherwise attached to the revolving member 22, consists of two adjacent concentric rings which have reflective 24 and non-reflective 26 areas. These opposing type areas alternate positions within each ring as well as alternate positions from outer to inner rings so that two of the same type areas will always be caddy-corner and never adjacent to one another. This forces one fiber optic cable 14 to lead into a reflective area 24 while the other fiber optic cable 16 is leading into a non-reflective area, or vise-versa as the revolving member 22 rotates.

The automatic reading process is initiated by the interrogation pulses 32, 34. These pulses activate the pulsed sources of light 28, 30 which will illuminate the optical pattern 20. This illumination is accomplished through the same fiber optic cables 14, 16 which will transmit the reflected light from the optical pattern 20. Again, the optical pattern 20 is arranged to present reflecting segments 24 to one or the other fiber optic cables 14, 16, but not both. Each light pulse reflected from the reflective segments or areas 24 is converted into an electrical pulse by means of a light sensing device 29, such as a photocell. The electric pulse generated by the light sensing device 29 is then routed to one of two digital coincidence detectors, either 36 or 38. A reflection of light that is a consequence of the interrogation pulse 32 is routed to digital coincidence detector 36 while a reflection of light that is a consequence of interrogation pulse 34 is routed to digital coincidence detector 38.

Digital coincidence detecting is necessary for accurate readings as it helps ensure that the signal received from the rotating member 22 was a reflection from a pulsed source 28, 30 and not some outside independent source. These detectors 36, 38 check to see if the two types of input simultaneously generated by the interrogation pulses 32 and 34, that is the subsequently reflected light signal and the direct interrogation signal, coincide with each other. This will prevent an outside source of light from being mistaken for the pulsed source of light.

Each digital coincidence detector 36, 38 generates a digital pulse train translation of the position of the optical pattern 20 at the tip of its respective fiber optic cable 14, 16. Two independent digital pulse trains will be created by the two digital coincidence detectors 36, 38. These pulse trains will then be inputted into a digital time domain difference detector 40 where the two digital pulse trains are differentially compared to each other and reduced into a single signal which lies in between the two. While a single line process, using one interrogation source and one digital coincidental detector, could be effectively used, the differential method, using two interrogation sources and two digital coincidental detectors, is the preferred embodiment as it helps ensure accurate output readings.

The digital time domain difference detector 40 generates a pulse and sends along a path 44 to a main counter only if a bistable internal element changes state. The change of state of the bistable internal element can only occur if the sequence of pulses contains an overwhelming majority of pulses from one or the other of the fiber optic cables 14 or 16. A mixture of pulses coming from the digital coincidence detectors 36 and 38 will not cause a change of state of the bistable element because a change of state can only occur if the reversible counter in the time domain difference detector 40 reaches its maximum count in one direction or in the other direction during the time duration of the gate 42.

This protocol is needed to eliminate spurious pulses from reaching the main counter, which accumulates pulses that represent meter reading during transition from one segment of the optical pattern 20 to the other. It should be evident that the above protocol can be applied to other sensing techniques such as, for example, magnetic sensing. It is also evident that the same configuration can be used with two light detectors and a single source of light, or with other fiber optic cable arrangements that will produce similar results. Also, it is possible to attain similar results by attaching a suitable optical pattern 20 to a reciprocating member rather than a revolving member 22. Furthermore, another optical pattern may have alternating transparent and opaque segments, rather than reflective and non-reflective segments.

FIG. 2 illustrates the billing system that could be built around the retrofitted meters. From the individual meter clusters, data is sent along suitable communication medium to local billing centers, to a central billing center, and finally, to a data processing center. Each meter cluster represents the meters that already exist or will exist in a household or place of business. As seen in the central meter cluster, a typical arrangement includes a gas meter 46, an electric power meter 48, a hot water meter 50, and a cold water meter 52. The meters 46, 48, 50, and 52 are all connected via the fiber optic cables 14 and 16 to the electronic pulse generating and processing section 12 which is itself integrated into the Sensing/Transmitting/Receiving (or S/T/R) module 54.

The S/T/R module 54 is located anywhere from zero to thirty five feet from the individual meters 46, 48, 50, and 52 for convenient monitoring by the consumer. The S/T/R module 54 includes an LCD display 58 for local visual readout of each meter and a number of selection buttons 56 for determining which of the data is to be viewed. The LCD display 58 may also be used to show the current rate charged for the commodity being measured by each meter 46, 48, 50, and 52. This feature is significant since it encourages consumption at times when demand is light, which would in turn helps to improve the efficiency of the entire gas, electric power, and water supply system.

The S/T/R module 54 is circuited to perform many functions. As already stated, the electronic pulse generating and processing section 12 of the S/T/R module 54 generates the interrogation pulses for each meter and processes the returned pulses from each meter. The S/T/R module 54 also accumulates pulse counts for each meter that constitute electronic meter reading in real time. Meter reading counts are stored in non-volatile memories precluding the loss of reading in the event of power failure. A rechargeable battery is included in the S/T/R module 54 to prevent loss of gas or water reading updating capability while electric power is interrupted.

The S/T/R module 54 also receives interrogation commands from the local billing center which initiate transfer of meter readings to the local billing center. This is accomplished through a communication medium which may include fiber optic cables, power lines, or telephone lines.

Since the S/T/R module 54 has circuitry capable of receiving and transmitting data, it can be used as a repeater to reconstitute signals on the data transmission lines. This feature is very valuable for data transmission via power lines. Power line signal attenuation can be quite severe, therefore, repeater mode of operation improves data transmission and makes it possible to transmit data via power lines over long distances.

The S/T/R module's circuitry will transmit a distress signal error when data is erroneous due to hardware failure of tampering.

It should be clear that the present invention is not limited to the previous descriptions and drawings which merely illustrate the preferred embodiment thereof. Slight departures may be made within the scope of the invention. Accordingly, the present invention is meant to embrace any and all equivalent apparatus as well as all design alterations as set forth in the appended claims.

What is claimed is:

1. A retrofitting assembly and optical sensing system providing automatic reading capability for utility meters, comprising,
   a plurality of fiber optic cables;
   an optical pattern mounted to a moving member of one of said utility meters;
   a cable lens joined to one set of terminal ends of said fiber optic cables and facing said optical pattern;
   a number of interrogation pulses for initiating reading sequence;
   a number of pulsed sources of light, triggered by said interrogation pulses, for generating light signals which travel through said fiber optic cable and onto said optical pattern;
   a light sensing device for converting light pulses reflected from said optical pattern to electrical signals;
   a number of digital coincidence detectors for receiving said electrical signals from said light sensing device for gating said electrical signals with said interrogation pulse;
   a digital time domain difference detector for differentially calculating outputs received from said number of digital coincidence detectors; and
   a control module for accumulating and electronically manipulating said differentially calculated output received from said digital time domain difference detector.

2. A retrofitting assembly and system providing automatic reading capability for utility meters as recited in claim 1, whereby there are two of said fiber optic cables, wherein said optical pattern is a circular arrangement of alternating reflective and non-reflective segments, and whereby said cable lens is joined to said two fiber optic cables and positioned so as to allow one of said fiber optic cables to face a reflective segment on said optical pattern while permitting the other to face a non-reflective segment on said optical pattern.

3. A retrofitting assembly and system providing automatic reading capability for utility meters as recited in claim 1, whereby said control module has an LCD display on its front face, and wherein a multiplicity of data selection buttons are located on said control module.

4. A retrofitting assembly and system providing automatic reading capability for utility meters as recited in claim 1, wherein said control module receives interrogation commands from local billing centers that initiate a transfer of meter readings to said local billing centers along a data communication medium.

5. A retrofitting assembly and system providing automatic reading capability for utility meters as recited in claim 4, wherein said control module may operate in a repeater mode in order to reconstitute signals sent along said data communication medium.

6. A retrofitting assembly and system providing automatic reading capability for utility meters as recited in claim 4, wherein data is further transferred from said local billing centers to a central billing center, and finally, to a data processing center.

\* \* \* \* \*